April 8, 1952  L. JACOLEV ET AL  2,591,700
PREPARATION OF SYNTHESIS GAS
Filed May 28, 1948
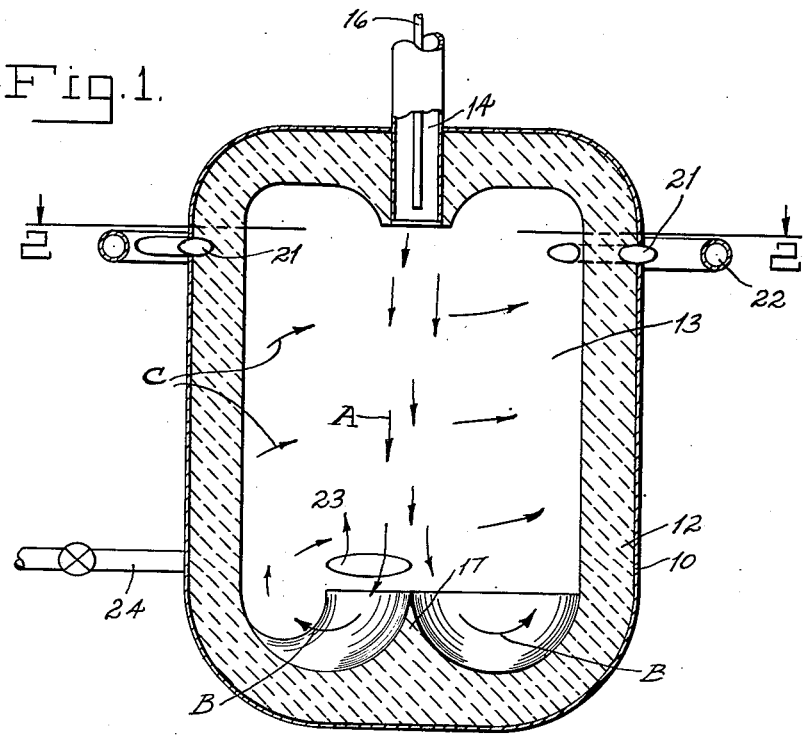
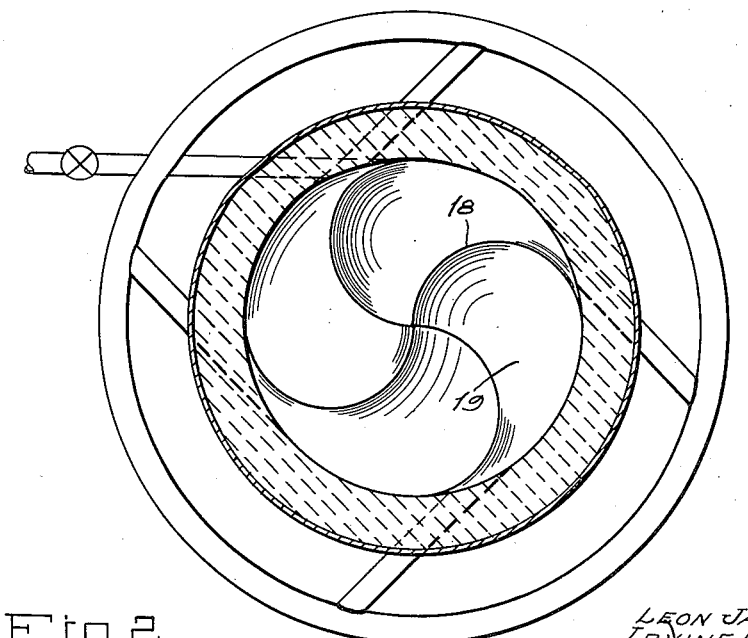
INVENTORS
LEON JACOLEV
IRVINE F. GERMAN, Jr.
BY
ATTORNEYS Patented Apr. 8, 1952

2,591,700

UNITED STATES PATENT OFFICE 2,591,700

PREPARATION OF SYNTHESIS GAS

Leon Jacolev, Irvington, N. J., and Irvine F. German, Jr., Bronx, N. Y., assignors to The Texas Company, New York, N. Y., a corporation of Delaware Application May 28, 1948, Serial No. 29,866

8 Claims. (Cl. 48—196)

The present invention relates to the preparation of synthesis gas suitable for the synthesis of hydrocarbons, oxygenated hydrocarbons and the like, by the partial combustion of a hydrocarbon with free or molecular oxygen under conditions resulting in high yields of hydrogen and carbon monoxide.

The invention contemplates the reaction of a hydrocarbon with a restricted proportion of free oxygen in an enclosed reaction zone comprising a substantially open or unobstructed space. The reactants, for example, pure oxygen and methane, are passed longitudinally of said zone at elevated reaction temperature and pressure from a point adjacent one extremity and, in the vicinity of the other extremity, reverse their direction so that the reversed stream of reactants moves as a segregated, adjacent flow in countercurrent heat exchange relationship with the incoming flow and is ultimately withdrawn near the point of original introduction.

Thus, the reactants undergo conversion into hydrogen and carbon monoxide while passing in a reversed path of flow through a preferably unobstructed reaction zone or space, and during the latter portion of the passage through the reaction space, are accordingly in preferably direct heat exchange with the incoming reactants.

In accordance with the broadest aspect of the invention, the two reactant flows, namely the incoming flow and the reverse flow may occupy any respective, adjacent portions of the reaction zone wherein they move without substantial intermixing. For example, the incoming reactants may pass longitudinally along the walls of the reaction zone, advantageously with a spiral or helical movement, at the opposite extremity thereof being redirected centrally through the outer flow.

It has been found particularly advantageous, however, to introduce the reactants axially at one end of the reaction zone, causing them to move longitudinally as a central column of flow, which is thereafter redirected in the opposite longitudinal direction about the incoming column, preferably as a spirally moving flow surrounding the central flow of incoming gases. In this way, the reversely moving stream forms a sheath about the central stream of reactants in direct transfer relationship with the intense radiant thermal energy liberated therein. This materially promotes the reaction so that maximum yields of hydrogen and carbon monoxide are realized and substantially increased quantities of reactants may be converted within reactors of relatively decreased volume.

It follows from the fact that the overall reaction, rather than involving direct production of molecular hydrogen and carbon monoxide as hitherto supposed, actually tends to occur in two phases. The first, or primary phase, is largely the exothermic formation of completely oxidized products, such as carbon dioxide and water. In other words, the highly reactive gases, in good admixture, react with great rapidity to yield initially substantial portions of carbon dioxide and water vapor which are consumed in subsequent adjustment to final equilibrium conditions.

The second phase involves the subsequent reaction between the aforesaid carbon dioxide and water vapor and the excess of hydrocarbon present as a result of complete oxidation of the remainder. This phase constitutes an approach to final equilibrium determined by the thermal conditions prevailing, and is endothermic in character. Since the heat liberated in the first phase, if conserved, is sufficient to supply the heat necessary for the second phase, and since high temperatures result in more favorable equilibrium of the second phase, it is desirable to effect efficient transfer of the thermal energy from the first to the second phase.

The present invention accomplishes this result by disposing the zone of predominantly second phase reaction in direct thermal exchange relationship with the initial or first phase zone of reaction. The zone of first phase reaction is thus enveloped and enclosed by a countercurrent or reversely moving flow of endothermically reacting components, so that the final reaction is brought to completion under the direct influence of the entire amount of radiant energy from the highly exothermic initial phase of reaction, and thus under conditions most favorable to high yields of desired product. In other words, since the exothermic reactions are essentially confined to the central portion of the reactor, the thermal energy must necessarily pass directly into the surrounding zone of second phase reactions which thus occur under the influence of maximum thermal energy at the point of reaction.

Therefore, the overall reaction may be carried out in a relatively limited reaction space which contributes materially to economy of size and investment required for large scale synthesis generation.

In addition, the walls of the reaction zone are protected from the direct erosive effect of the intense first phase reaction by the surrounding stream or sheath of endothermically reacting gases, which absorb excess radiant energy and prevent dangerous temperature rise at the confining refractory surfaces.

The process is carried out with reactants flowing continually in a predetermined path with substantially no interruption in flow and no objectionable intermixing of the different reaction phases in the respective reversely moving flows.

In order to illustrate and exemplify the invention, reference is had to the attached drawing wherein Figure 1 is a more or less diagrammatic sectional elevation through a reactor embodying the principles of the present invention; and Figure 2 is a sectional view taken on the line 2—2 of Figure 1.

The apparatus shown in the figures comprises a cylindrical vessel 10, provided with a suitable lining 12 of refractory material resistant to high temperatures, defining an inner gas generation or reaction zone 13.

As indicated above, the reaction zone preferably comprises an unobstructed or open space unoccupied by catalyst, packing or barriers of any sort. The reactants, e. g., methane and free oxygen, are introduced through respective outer and inner ducts 14 and 16 of a mixing burner, preferably with a preheat of, for example, 1000° F. and are projected axially downwardly through the central portion of the reaction zone as an axially moving column.

In this column, the first phase, highly exothermic reaction proceeds at temperatures above about 1800-2000° F., preferably substantially thereabove, for example, as high as 3000 to 3500° F., depending primarily on the degree of preheat.

At the lower extremity of the reactor, the downwardly projected flow of the column of gas meets deflecting surfaces suitably formed to reverse the flow of reactants, forming an upwardly moving flow or annulus of reactants between the downwardly directed stream and the walls of the reaction zone. Preferably, as indicated above, the upwardly moving reactants are given a rotational movement in the course of their flow reversal whereby the radially disposed annulus of reversely moving reactants follows a generally helical or spiral path. This is of particular advantage in that in general the second phase of the partial combustion consumes a relatively greater time period than the initial or exothermic phase of the reaction, and accordingly is favored by a relative increase in residence time.

To this end, the bottom of the reactor in the figures is provided with a refractory projection 17, from which extend radial, helical ridges or convolutions 18 defining intermediate helical channels 19. Impinging upon these convoluted formations, the centrally projected flow of reactants, diagrammatically represented by the arrows A, is deflected through 180 degrees by surfaces 19, which are semicircular in radial section. During reversal of flow, the gases move as indicated by arrows B. Simultaneously, the helical convolutions 18 and 19 impart a rotational movement, in a spiral path, as indicated diagrammatically by the arrows C. The flow C, after progressing upwardly to a point near the top of the reaction zone, is withdrawn, preferably tangentially, through a plurality of outlet conduits 21, communicating with a common header 22.

It is to be understood that the specific means or instrumentality for effecting redirection of the stream A and rotational movement of the annular stream of reactants, per se, may take any of a number of forms which will occur to those skilled in the art, in view of the above disclosure.

For example, as indicated in the drawings, rotational movement may be imparted to the flow C by means of a tangentially disposed nozzle directing a high velocity flow of gas at a rate sufficient to pick up and whirl the remainder of the gas. The tangentially injected flow may comprise a portion of the hydrocarbon gas necessary to complete the reaction.

To this end, inlet nozzle 23, extending tangentially through walls 10 and 12, receives a stream of methane under pressure through pipe 24. In the cylindrical reaction zone 13, the methane is immediately deflected in a rotational path.

Use of a stream of methane at this point is advantageous in protecting adjacent refractory surfaces from the erosive impact of intensely exothermic streams. It becomes feasible as the result of the fact, disclosed above, that the first phase of the partial combustion of hydrocarbons predominantly involves complete combustion of the reactions to water and carbon dioxide. Therefore, the first phase is operable where the proportion of hydrocarbon is less than that required for partial combustion. The so-called incomplete or partial combustion of any of the hydrocarbon gases, by which is meant, the production of predominantly and essentially hydrogen and carbon monoxide requires a reactant mixture in which the overall atomic ratio of oxygen to carbon approximately 1:1.

The present invention contemplates use of an overall feed of hydrocarbon gas and free oxygen in this range. Since a slight excess of oxygen, usually up to about 20 per cent of that indicated, is usually advantageous, the term "approximate," or "approximately," as used herein, contemplates such variation.

However it will be apparent that any portion of the total feed hydrocarbon gas over and above that sufficient to effect the initial or first phase reaction may be withheld, and introduced in advance of the second phase reaction, as indicated. The amount of hydrocarbon gas which may be withheld from the first phase reaction for introduction to the second phase may comprise any portion of the hydrocarbon stream required for partial combustion in excess of that capable of being essentially completely oxidized to carbon dioxide and water vapor, by the free oxygen supplied. In other words, the first phase requires only that quantity of hydrocarbon necessary for complete combustion.

In operation, the reactants, as intimated above, are advantageously preheated, preferably to as high a temperature as feasible, that is, from 200° F. upward, and preferably in the range of 800 to 1000° F. Increased preheat results in correspondingly increased temperatures in the reaction zone and correspondingly favorable yields of hydrogen and carbon monoxide. Maximum temperatures are usually determined by the structural limitations of the generator and particularly the ability of the refractory to withstand the high temperatures involved.

The invention particularly contemplates reaction under elevated pressures, for example, over 100 p. s. i., preferably 200–400 p. s. i., among other things resulting in a substantial saving in compression costs of the desirably high pressure synthesis gas product.

The effectiveness of the present process in converting the hydrocarbon essentially to hydrogen and carbon monoxide makes it advisable to supply the reactants in relatively pure form, and to this end, the free oxygen requirement is advantageously met by oxygen of high purity, at the least by an enriched air stream, and preferably a rectified oxygen stream of at least 90–95 and preferably as high as 98 per cent molecular oxygen.

For example, a stream of oxygen of about 99 per cent purity is reacted with a natural gas comprising essentially methane in the reactor disclosed above at a temperature of about 2400° F. and about 200 p. s. i. g. The natural gas, in addition to the methane contains small proportions of similar light hydrocarbon gases and corresponds to the overall empirical formula $C_{1.042}H_{4.084}$. The pure oxygen stream is mixed in the proportion of about 61 mol parts $O_2$, with 100 mols of natural gas and the mixture passed axially through the reaction zone and caused to move reversely along the walls.

The product gas has approximately the following composition:

|  | Mols |
|---|---|
| $H_2$ | 187.0 |
| CO | 101.0 |
| $CH_4$ | 0.2 |
| $CO_2$ | 3.0 |
| $H_2O$ | 16.8 |

This represents a close approach to ultimate equilibrium. It is significant that these results are realized at a rate of reactant feed much greater than that which could be tolerated where the reactants are simply introduced at one extremity of the reaction zone and withdrawn from the other extremity, in accordance with prior practice. For example, the rate of reactant feed introduction may frequently be increased as much as twice the maximum rate at which a gas of similar equilibrium composition can be produced in a unidirectional flow reactor of identical volume.

The invention of course contemplates rapid cooling of the product gases by quenching or rapid indirect heat exchange to obviate the losses which may occur on slow cooling. It may be further noted that while the invention primarily intends flowing the reverse stream of second phase reactants in direct exchange relationship with the incoming column of reactants, some of the advantages of the present invention may be experienced to a limited extent where indirect heat exchange is practiced. To this end, the central incoming flow of reactants may be permitted to burn within a centrally disposed tube of heat conducting material, about which the annulus of upwardly moving reactants circulate in a reversely moving stream. For example, a tube of suitable heat resistant, thermally conducting material may be suspended from the top of the reaction zone about the burner nozzle in the embodiment shown in the drawing, terminating at a point spaced from the bottom of the reactor whereby intermixing of the reversely flowing streams is positively prevented.

In view, however, of the emphatic advantages of direct exchange between the reversely moving gas flows it will be understood that substantial integrity of the respective flows be maintained. To this end, the burner 17 is advantageously of a construction effective to direct a reasonably cylindrical or columnar stream of reactants instead of excessively conical or expanding stream such as would tend to result in excessive mixing with the radially outer sheath of reactants undergoing second phase reaction.

The foregoing disclosure has been presented largely in terms of partial combustion of lower, normally gaseous hydrocarbons. It is to this type of operation that the invention is primarily directed since in the case of gaseous reactants, the two-phase phenomenon referred to above is particularly significant. Substantially the same considerations prevail in the case of the partial combustion of normally liquid hydrocarbons which are vaporized by preheating and supplied to the reaction zone as a gasiform stream.

Obviously, many modifications and variations of the invention as hereinabove set forth may be made without departing from the spirit and scope thereof, and therefore only such limitations should be imposed as are indicated in the appended claims.

We claim:

1. In the process of producing synthesis gas comprising essentially hydrogen and carbon monoxide by the partial combustion of a stream of gasiform hydrocarbon, wherein said hydrocarbon is reacted with oxygen in a relative proportion approximating one atom of oxygen per atom of carbon, the improvement which comprises passing a stream of said reactants axially and centrally through a predetermined path of flow in a substantially unobstructed reaction zone, maintaining reaction conditions in said reaction zone including a superatmospheric pressure and a temperature above about 2000° F., effecting combustion of said reactants during said flow, thereafter reversing the direction of said reactants and causing said stream to move reversely through said reaction zone in radially spaced relationship surrounding said first-named flow in substantially direct heat exchange relationship thereto as a segregated stream moving oppositely to the first named flow, simultaneously causing said reversely flowing stream to move rotationally about the central axis of said reaction zone, effecting substantial completion of the reaction during said reversed flow to the reaction zone and withdrawing the products of reaction.

2. In the process of producing synthesis gas comprising essentially hydrogen and carbon monoxide by the partial combustion of a stream of gasiform hydrocarbon, wherein said hydrocarbon is reacted with oxygen in a relative proportion approximating one atom of oxygen per atom of carbon, the improvement which comprises passing a stream comprising said reactants into a substantially cylindrical and substantially unobstructed reaction zone from a point adjacent one axial extremity thereof, causing said stream to move axially through the central portion of said reaction zone as a central column of flow restricted essentially to said central portion at a superatmospheric pressure at an elevated temperature above about 2000° F., initiating combustion of the reactants during said flow, reversing the direction of flow at a point adjacent the opposite extremity of said reaction zone, causing said reverse stream to flow through the annular space about the first named central flow in an opposite axial direction and in spaced relationship to said first named flow, thereby maintaining oppositely moving segregated flows in direct heat exchange relationship, simultaneously causing said reverse flow to move rotationally about the central axis of said reaction zone, effecting substantial completion of the reaction during said reverse flow, and withdrawing the gaseous products thereof from the reaction zone.

3. The method according to claim 2, wherein a portion of said hydrocarbon is injected in the vicinity of said opposite axial extremity of the reaction zone.

4. The method according to claim 2, wherein said hydrocarbon is predominantly methane.

5. The method according to claim 2, wherein said oxygen comprises a high purity stream of oxygen.

6. The method according to claim 2, wherein said reactants are introduced to the reaction zone at an elevated temperature.

7. In the process of producing synthesis gas comprising essentially hydrogen and carbon monoxide by the partial combustion of a stream of gasiform hydrocarbon, wherein said hydrocarbon is reacted with oxygen in a relative proportion approximating one atom of oxygen per atom of carbon, the improvement which comprises passing into a substantially unobstructed reaction zone a stream comprising said oxygen and a portion of said hydrocarbon at least approximating that sufficient for substantially complete combustion by the oxygen, conducting said stream in a predetermined flow centrally and axially of said reaction zone at a temperature of above about 2000° F. and at an elevated pressure, causing combustion of said reactants during said flow, reversing said flow of reactants at the extremity thereof, introducing the remaining portion of said hydrocarbon into the reversely flowing stream such that the overall relative proportion of oxygen approximates one atom of oxygen per atom of carbon in the feed, causing said reverse stream to pass in the annular space between said first-named central flow and the walls of the reaction zone, in an opposite axial direction and in spaced, segregated direct heat exchange relationship to said first named central flow, simultaneously causing said reverse stream to move rotationally about the central axis of said reaction zone effecting substantial completion of said reaction during said reverse flow through the reaction zone in direct heat exchange relationship with said first-named central flow, and withdrawing the gaseous products of said reverse flow after passage axially of the reaction zone.

8. The method according to claim 7, wherein the said remaining portion of said hydrocarbon is injected tangentially to effect rotational movement of said reverse flow about said axis.

LEON JACOLEV.
IRVINE F. GERMAN, Jr.

REFERENCES CITED

The following references are of record in the file of this patent:

UNITED STATES PATENTS

| Number | Name | Date |
|---|---|---|
| 286,589 | Chamberlain | Oct. 16, 1883 |
| 1,723,418 | Hackford | Aug. 6, 1929 |
| 1,836,627 | Suffern | Dec. 15, 1931 |
| 1,924,856 | Heller | Aug. 29, 1933 |
| 1,966,610 | Chilowsky | July 17, 1934 |
| 1,971,728 | Peller | Aug. 28, 1934 |

FOREIGN PATENTS

| Number | Country | Date |
|---|---|---|
| 300,328 | Great Britain | Nov. 15, 1928 |